(12) United States Patent
Ohno et al.

(10) Patent No.: US 11,333,492 B2
(45) Date of Patent: May 17, 2022

(54) OPTICAL DEVICE, INFORMATION PROCESSING METHOD, AND COMPUTER PROGRAM PRODUCT

(71) Applicant: KABUSHIKI KAISHA TOSHIBA, Tokyo (JP)

(72) Inventors: Hiroshi Ohno, Chuo Tokyo (JP); Hiroya Kano, Kawasaki Kanagawa (JP); Hideaki Okano, Yokohama Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/005,526

(22) Filed: Aug. 28, 2020

(65) Prior Publication Data
US 2021/0293537 A1 Sep. 23, 2021

(30) Foreign Application Priority Data
Mar. 18, 2020 (JP) .............................. JP2020-047218

(51) Int. Cl.
*G01B 11/30* (2006.01)
*G02B 27/10* (2006.01)
(Continued)

(52) U.S. Cl.
CPC ............ *G01B 11/303* (2013.01); *G01B 11/24* (2013.01); *G01B 11/25* (2013.01);
(Continued)

(58) Field of Classification Search
CPC ....... G01B 11/303; G01B 11/30; G01B 11/24; G01B 11/25; G01B 11/2509
See application file for complete search history.

(56) References Cited

U.S. PATENT DOCUMENTS 5,237,404 A * 8/1993 Tanaka ................. G01B 11/303
348/128
5,675,407 A 10/1997 Geng
(Continued)

FOREIGN PATENT DOCUMENTS

JP 2002-328094 A 11/2002
JP 2008-209726 A 9/2008
(Continued)

OTHER PUBLICATIONS

Howes, "Rainbow schlieren and its applications," Applied Optics (Jul. 15, 1984), 23:2449-60.
(Continued)

*Primary Examiner* — Dominic J Bologna
(74) *Attorney, Agent, or Firm* — Finnegan, Henderson, Farabow, Garrett & Dunner L.L.P

(57) ABSTRACT

According to an embodiment, an optical device includes a light selection unit, an imaging element, and a deriving unit. The light selection unit splits an irradiated light beam into a plurality of spectral beams of different wavelength regions. The imaging element captures a subject irradiated with the spectral beams including beams of at least two different wavelengths to acquire a spectral image. The deriving unit derives a surface property or shape information of the subject from a specified result obtained by specifying, by the deriving unit, an irradiation region irradiated with each of the spectral beams on the subject based on a mixing ratio of the spectral beams and received light intensity of each of the spectral beams included in the spectral image.

15 Claims, 13 Drawing Sheets

(51) Int. Cl.
   *G02B 27/30* (2006.01)
   *H04N 5/30* (2006.01)
   *G01J 3/18* (2006.01)
   *G01J 3/42* (2006.01)
   *G01J 3/28* (2006.01)
   *G01B 11/25* (2006.01)
   *G01B 11/24* (2006.01)

(52) U.S. Cl.
   CPC .......... *G01B 11/2509* (2013.01); *G01B 11/30* (2013.01); *G01J 3/18* (2013.01); *G01J 3/2823* (2013.01); *G01J 3/42* (2013.01); *G02B 27/1013* (2013.01); *G02B 27/1086* (2013.01); *G02B 27/30* (2013.01); *H04N 5/30* (2013.01); *G01N 2201/0635* (2013.01)

(56) References Cited

U.S. PATENT DOCUMENTS

| | | | |
|---|---|---|---|
| 2003/0007159 A1* | 1/2003 | Franke | G01B 11/2504 356/604 |
| 2007/0035818 A1* | 2/2007 | Bahatt | G01N 21/276 359/366 |
| 2008/0316500 A1* | 12/2008 | Schulte | G01B 9/02057 356/521 |
| 2013/0098127 A1* | 4/2013 | Isei | B21C 51/00 72/17.3 |
| 2016/0274017 A1* | 9/2016 | Bencic | G01N 15/06 |
| 2018/0045508 A1* | 2/2018 | Matsumoto | G01B 11/2513 |
| 2019/0219501 A1 | 7/2019 | Ohno et al. | |
| 2020/0333135 A1* | 10/2020 | Hong | G01B 11/25 |

FOREIGN PATENT DOCUMENTS

| | | |
|---|---|---|
| JP | 2010-251168 A | 11/2010 |
| JP | 2019-124542 A | 7/2019 |

OTHER PUBLICATIONS

Kim et al., "Multiaperture telecentric lens for 3D reconstruction," Optics Letters (Apr. 1, 2011), 36:1050-52.

* cited by examiner

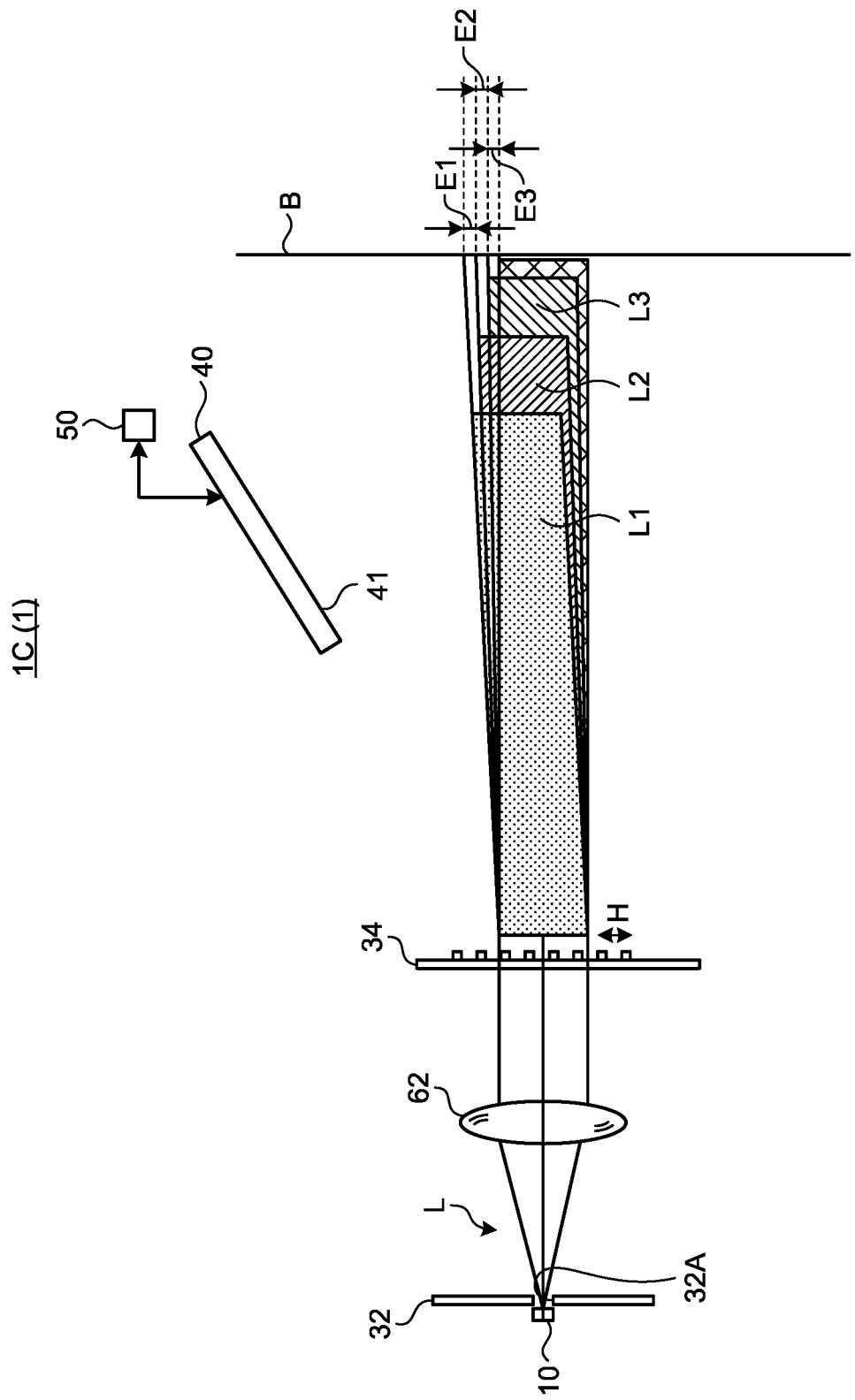

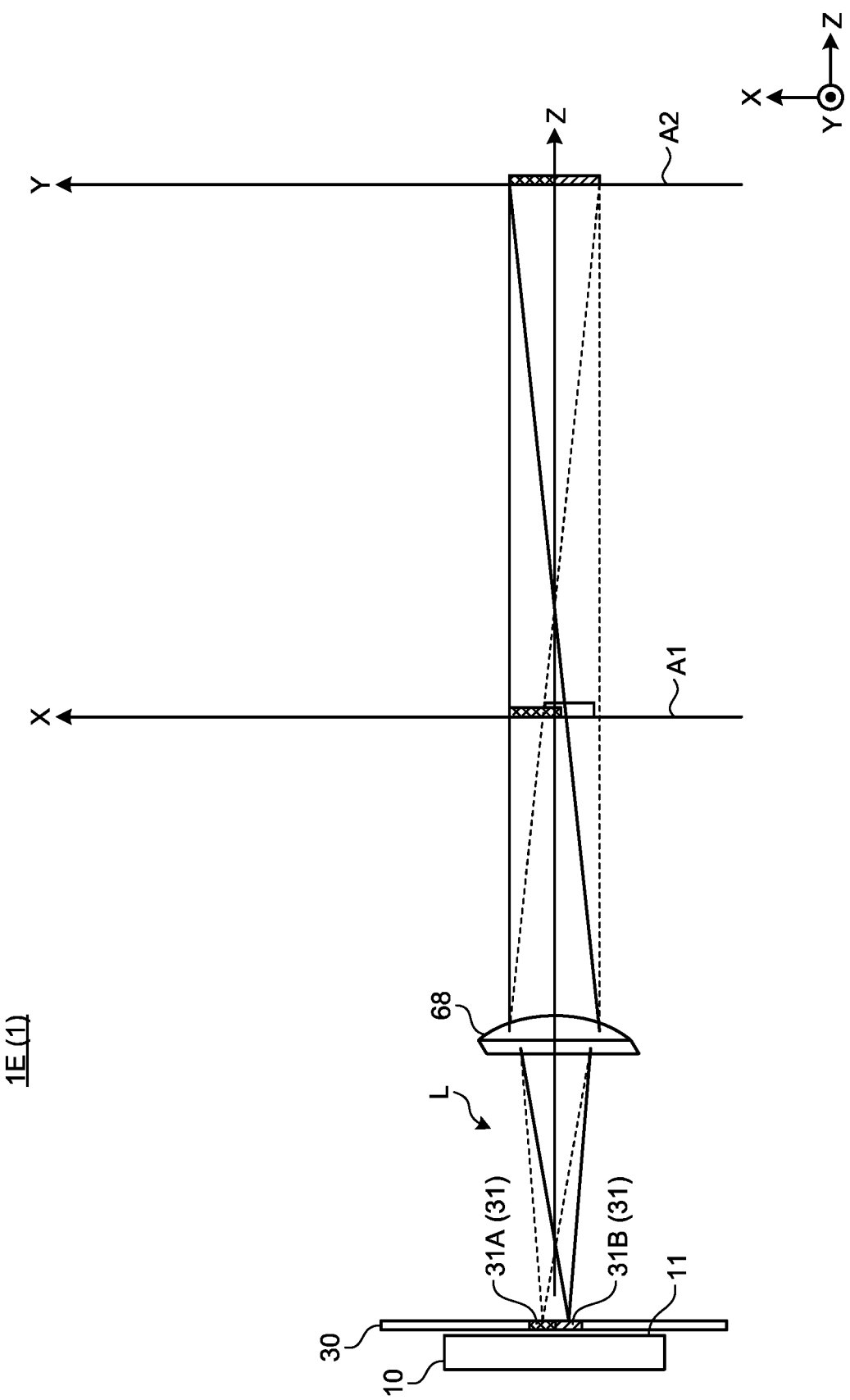

OPTICAL DEVICE, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2020-047218, filed on Mar. 18, 2020; the entire contents of which are incorporated herein by reference.

FIELD

Embodiments described herein relate generally to an optical device, an information processing method, and a computer program product.

BACKGROUND

In various industries, shape measurement of an object in a noncontact manner has become important. For example, there has been disclosed a method of acquiring a shape of an object by splitting light to irradiate the object, and acquiring an image subjected to light splitting by an imaging element.

However, in the related art, accuracy in measuring a shape of a subject may be lowered depending on spreading of light in the case of splitting the light to be irradiated to the subject.

BRIEF DESCRIPTION OF THE DRAWINGS

FIG. 6 is a schematic diagram of the optical device;
FIG. 11 is a schematic diagram of the optical device.

DETAILED DESCRIPTION

Figure 1:
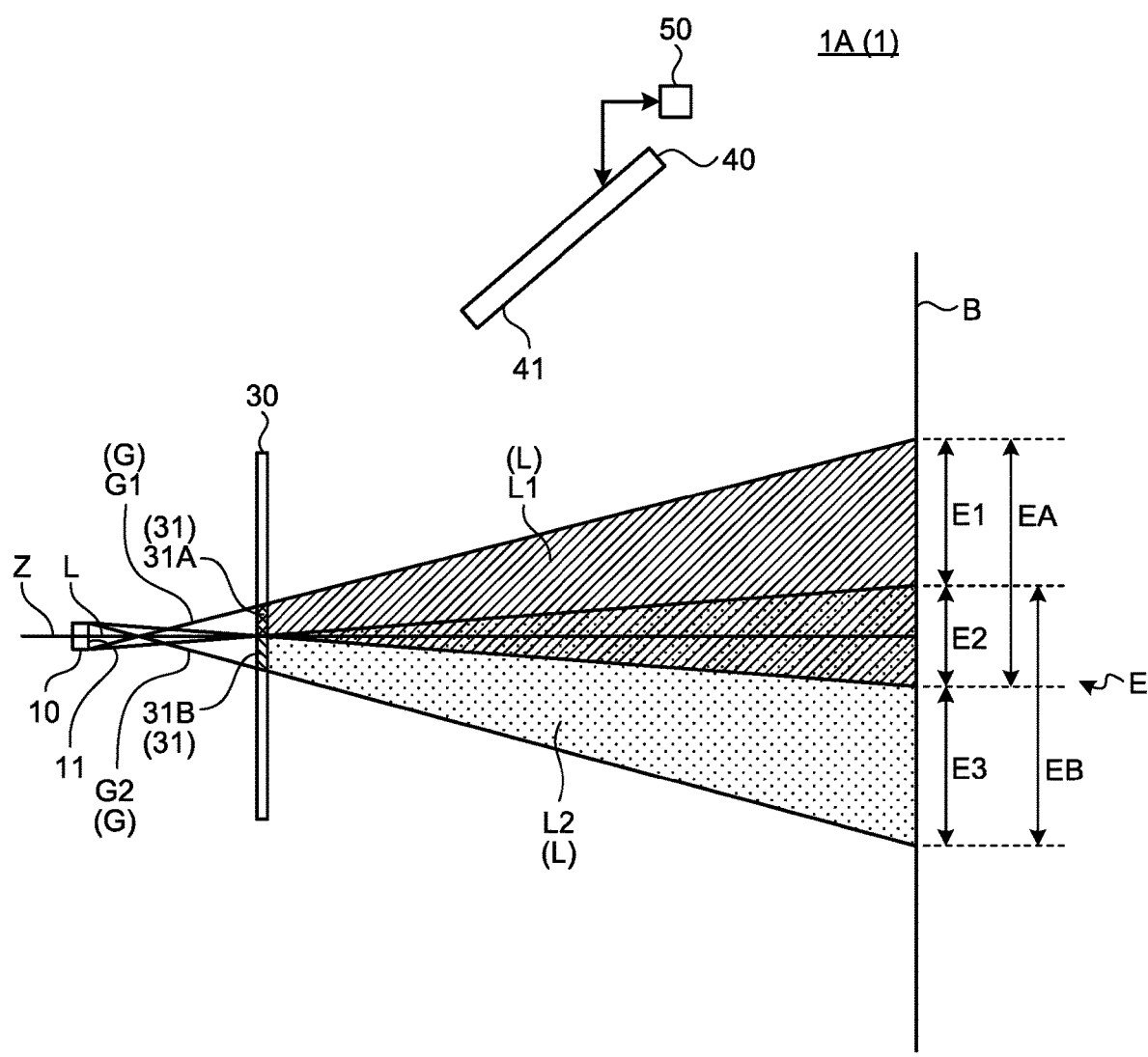
FIG. 1 is a schematic diagram of an optical device.

According to an embodiment, an optical device includes a light selection unit, an imaging element, and a deriving unit.

The light selection unit is configured to split an irradiated light beam into a plurality of spectral beams of different wavelength regions. The imaging element is configured to capture a subject irradiated with the spectral beams including beams of at least two different wavelengths to acquire a spectral image. The deriving unit is configured to derive a surface property or shape information of the subject from a specified result obtained by specifying, by the deriving unit, an irradiation region irradiated with each of the spectral beams on the subject based on a mixing ratio of the spectral beams and received light intensity of each of the spectral beams included in the spectral image.

The following describes an optical device according to an embodiment in detail with reference to the attached drawings.

The drawings used for description of the embodiment are schematic or conceptual, and a relation between a thickness and a width of each portion, a ratio of size between portions, and the like are not necessarily the same as an actual relation or ratio. Even in a case of representing the same portion, dimensions or a ratio may be different between the drawings. Throughout the present specification and the drawings, the same element as the element previously described with reference to the drawing that has already been described is denoted by the same reference numeral, and detailed description thereof is omitted as appropriate.

First Embodiment

FIG. 1 is a schematic diagram illustrating an example of an optical device 1A according to the present embodiment.

The optical device 1A is an example of an optical device. In a case of collectively describing optical devices according to the present embodiment and embodiments described later, the optical devices may be simply referred to as an optical device 1 in some cases.

The optical device 1A includes a light source 10, a light selection unit 30, an imaging element 40, and an information processing device 50. The imaging element 40 and the information processing device 50 are connected to each other to be able to exchange data or signals.

The light source 10 emits a light beam R. The light beam R is an example of an electromagnetic wave.

The light source 10 may include a light emitting surface 11 having a finite size, and may emit an electromagnetic wave. The light emitting surface 11 is an emitting surface for the light beam R in the light source 10. The finite size of the light emitting surface 11 means that the light source 10 is substantially larger than a point light source in an optical system.

The light beam R emitted by the light source 10 is, for example, a visible ray, an X-ray, an infrared ray, a microwave, and the like. The light beam R emitted by the light source 10 may be any of coherent light and incoherent light. The coherent light is, for example, a laser beam. The incoherent light is, for example, a light emitting diode (LED).

In the present embodiment, the light source 10 is assumed to be an LED as an example. The light source 10 is not limited to the LED, and may be an incandescent light bulb, a fluorescent tube, a mercury lamp, and the like. The light source 10 may be a light source that emits a laser, an infrared ray, an X-ray, or the like. A wavelength included in the light beam R emitted from the light source 10 may be determined in accordance with wavelength selectivity of the light selection unit 30 described later.

The present embodiment describes a case in which the light beam R irradiated from the light source 10 is an electromagnetic wave, for example, visible light, as an example. Specifically, the present embodiment describes a case in which the light beam R irradiated from the light source 10 includes a light beam having a wavelength in a visible light region from 400 nm to 800 nm, as an example. The wavelength included in the light beam R is not limited thereto.

The LED as the light source 10 according to the present embodiment may be an LED including the light emitting surface 11 having a finite size. The present embodiment describes a case in which the size of the light emitting surface 11 is assumed to be 0.2 mm×0.2 mm. The size of the light emitting surface 11 is not limited thereto.

A subject B is an inspection target by the optical device 1A. The subject B may be a target by which the light beam R irradiated via the light selection unit 30 (described later) is refracted or scattered. The subject B is, for example, a living cell, an object including a laser welding region, and the like, but is not limited thereto. The laser welding region is a region that is welded by a laser. The subject B may be any of a solid, liquid, and gas. The present embodiment describes a case in which the subject B is a solid, as an example.

The light selection unit 30 splits the light beam R irradiated from the light source 10 into a plurality of light beams of different wavelength regions. In the following description, the split light beam R is referred to as a spectral beam L.

The present embodiment describes a case in which the light selection unit 30 splits the light beam R irradiated from the light source 10 into a first spectral beam L1 of a first wavelength region and a second spectral beam L2 of a second wavelength region, as an example. In this embodiment, a spectral beam means a beam that is defined with multiple wavelengths including the first and the second wavelengths. Each of the first spectral beam L1 and the second spectral beam L2 is an example of the spectral beam L. The first wavelength region and the second wavelength region are different wavelength regions. The light selection unit 30 may have a configuration of splitting the spectral beam L into three or more different wavelength regions, and is not limited to a form of splitting the spectral beam L into the first spectral beam L1 and the second spectral beam L2.

The light selection unit 30 causes the first spectral beam L1 and the second spectral beam L2 as light beams R of different wavelength regions to pass through different wavelength selection regions 31. The light selection unit 30 may have a form of causing the first spectral beam L1 and the second spectral beam L2 to pass in different directions. That is, the light selection unit 30 may have a function of causing the light beams R of different wavelength regions to pass through different positions of the light selection unit 30, or to pass in different directions from the light selection unit 30.

In the present embodiment, the light selection unit 30 includes a first wavelength selection region 31A and a second wavelength selection region 31B as the wavelength selection regions 31.

The first wavelength selection region 31A and the second wavelength selection region 31B are disposed at different positions on a two-dimensional plane orthogonal to an optical axis Z of the light selection unit 30. The first wavelength selection region 31A and the second wavelength selection region 31B cause the light beams R of different wavelength regions to pass therethrough, respectively.

"Cause the light beam R to pass" means at least one of "transmit the light beam R" and "regularly reflect the light beam R". In both cases of transmission and regular reflection, in a case in which the light beam passes over an optical path of light that reaches the imaging element 40 described later, any of transmission and regular reflection is referred to as "passage". The present embodiment describes a case in which "passage" means "transmission" as an example.

The first wavelength selection region 31A causes the first spectral beam L1 of the first wavelength region to pass therethrough. The second wavelength selection region 31B causes the second spectral beam L2 of the second wavelength region to pass therethrough.

For example, assumed is a case in which the first spectral beam L1 of the first wavelength region is the light beam R of blue color (for example, having a wavelength of 450 nm). Additionally, assumed is a case in which the second spectral beam L2 of the second wavelength region is the light beam R of red color (for example, having a wavelength of 650 nm). In this case, the first wavelength selection region 31A causes the first spectral beam L1 of blue color included in the irradiated light beam R to pass therethrough, and the second wavelength selection region 31B causes the second spectral beam L2 of red color included in the light beam R to pass therethrough.

The first wavelength selection region 31A and the second wavelength selection region 31B may be implemented by disposing a band-pass filter corresponding to the wavelength region of the light beam R to be passed at an opening disposed on the light selection unit 30, for example. Specifically, the first wavelength selection region 31A may be constituted of a band-pass filter corresponding to the first wavelength region, and the second wavelength selection region 31B may be constituted of a band-pass filter corresponding to the second wavelength region. A width of the band-pass filter of each of the first wavelength selection region 31A and the second wavelength selection region 31B may be 0.1 mm, for example. The width of the band-pass filter is not limited to this value.

The imaging element 40 captures the subject B irradiated with the first spectral beam L1 and the second spectral beam L2, and acquires a spectral image. The spectral image is a captured image of a plurality of split, different wavelength regions. In the present embodiment, the imaging element 40 captures a spectral image of at least the split first wavelength region and the split second wavelength region.

The imaging element 40 is, for example, a Charge-Coupled Device (CCD), a Complementary Metal-Oxide Semiconductor (CMOS), and the like. As the imaging element 40, a Hyperspectrum camera that can acquire at least five or more different wavelength regions may be used.

The present embodiment describes a case in which the imaging element 40 is an imaging element including a photoelectric conversion element (photodiode) arranged for each pixel, as an example. The imaging element 40 receives at least the first spectral beam L1 and the second spectral beam L2 in a split manner for each of a plurality of pixels. Light intensity of the light beam R received by each pixel may be referred to as received light intensity, intensity, or a pixel value. In the following description, the light intensity of the light beam R received by each pixel is referred to as a pixel value.

For example, the imaging element 40 may have a configuration including a plurality of wavelength filters for each pixel. The wavelength filters are filters that selectively transmit the light beams R of different wavelengths. With the configuration including the wavelength filters for each pixel, the imaging element 40 can split light for each pixel. That is, the imaging element 40 can capture spectral images of the split first wavelength region and the split second wavelength region at the same time.

Next, the following describes an optical effect of the optical device 1A.

The first spectral beam L1 of the first wavelength region included in the light beam R irradiated from the light source 10 passes through the first wavelength selection region 31A, and reaches the subject B. That is, a specific irradiation region EA on a surface of the subject B is irradiated with the first spectral beam L1. The irradiation region EA irradiated with the first spectral beam L1 is a region including, as a boundary, an edge light beam G1 of the light beam R of the first wavelength region, the edge light beam G1 that is emitted from an end part of the light emitting surface 11 having a finite size of the light source 10 and passes through an end part of the first wavelength selection region 31A. That is, the irradiation region EA irradiated with the first spectral beam L1 is a region defined by the edge light beam G1.

On the other hand, the second spectral beam L2 of the second wavelength region included in the light beam R irradiated from the light source 10 passes through the second wavelength selection region 31B, and reaches the subject B. That is, a specific irradiation region EB on the surface of the subject B is irradiated with the second spectral beam L2. The irradiation region EB irradiated with the second spectral beam L2 is a region including, as a boundary, an edge light beam G2 of the light beam R of the second wavelength region, the edge light beam G2 that is emitted from the end part of the light emitting surface 11 having a finite size of the light source 10 and passes through an end part of the second wavelength selection region 31B. That is, the irradiation region EB irradiated with the second spectral beam L2 is a region defined by the edge light beam G2.

In a case in which the light emitting surface 11 of the light source 10 is a point light source, the irradiation region EA irradiated with the first spectral beam L1 does not overlap with the irradiation region EB irradiated with the second spectral beam L2. A definition of "does not overlap" includes a case in which only respective boundaries of the irradiation region EA and the irradiation region EB overlap with each other.

On the other hand, in the light source 10 according to the present embodiment, the light emitting surface 11 of the light source 10 has the finite size as described above. Accordingly, the irradiation region EA irradiated with the first spectral beam L1 and the irradiation region EB irradiated with the second spectral beam L2 have overlapping regions.

Specifically, as illustrated in FIG. 1, an irradiation region E of the subject B irradiated with the light beam R is classified into a first irradiation region E1, a second irradiation region E2, and a third irradiation region E3.

The first irradiation region E1 is a region on the subject B to which only the first spectral beam L1 of the first wavelength region is irradiated. The second irradiation region E2 is a region on the subject B to which the first spectral beam L1 of the first wavelength region and the second spectral beam L2 of the second wavelength region are irradiated in an overlapping manner. The third irradiation region E3 is a region on the subject B to which only the second spectral beam L2 is irradiated. Therefore, each irradiation region has a different mixing ratio of the spectrum beam L1 to the spectrum beam L2.

When the first spectral beam L1 and the second spectral beam L2 are irradiated, the imaging element 40 captures the subject B on which the first irradiation region E1, the second irradiation region E2, and the third irradiation region E3 are formed, and obtains a spectral image.

Next, the following describes the information processing device 50.

The information processing device 50 is connected to the imaging element 40 to be able to exchange data or signals. The information processing device 50 analyzes the spectral image captured by the imaging element 40.

Figure 2:
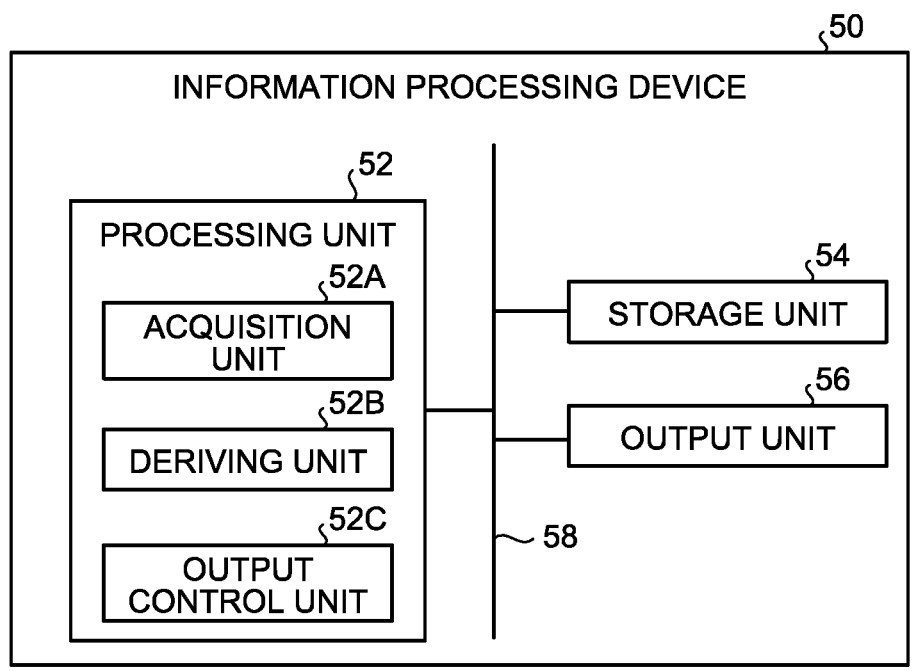
FIG. 2 is a block diagram of a functional configuration of an information processing device.

FIG. 2 is a block diagram illustrating an example of a functional configuration of the information processing device 50. The information processing device 50 includes a processing unit 52, a storage unit 54, and an output unit 56. The processing unit 52, the storage unit 54, and the output unit 56 are connected to be able to exchange data or signals via a bus 58.

The storage unit 54 stores various kinds of data. The storage unit 54 is, for example, a semiconductor memory element such as a RAM and a flash memory, a hard disk, an optical disc, and the like. The storage unit 54 may be a storage device that is disposed outside the information processing device 50. The storage unit 54 may also be a storage medium. Specifically, the storage medium may be a storage medium that stores or temporarily stores a computer program and various kinds of information that are downloaded via a local area network (LAN), the Internet, and the like. The storage unit 54 may include a plurality of storage media.

The output unit 56 outputs various kinds of information. For example, the output unit 56 includes at least one of a display, a speaker, and a communication unit that communicates with an external device via a network.

The processing unit 52 includes an acquisition unit 52A, a deriving unit 52B, and an output control unit 52C. At least one of the acquisition unit 52A, the deriving unit 52B, and the output control unit 52C is, for example, implemented by one or a plurality of processors. For example, each of the units described above may be implemented by causing a processor such as a central processing unit (CPU) to execute a computer program, that is, by software. Each of the units described above may also be implemented by a processor such as a dedicated integrated circuit (IC), that is, by hardware. Each of the units described above may also be implemented by using both of software and hardware. In a case of using a plurality of processors, each of the processors may implement one of the units, or may implement two or more of the units.

The acquisition unit 52A acquires the spectral image from the imaging element 40.

The deriving unit 52B specifies the irradiation region E on the subject B irradiated with each of a plurality of the spectral beams L based on the received light intensity of each of the spectral beams L included in the spectral image acquired by the acquisition unit 52A. The deriving unit 52B then derives shape information of the subject B from a specified result thereof.

In the present embodiment, the deriving unit 52B specifies the irradiation region E irradiated with each of the first spectral beam L1 and the second spectral beam L2 on the subject B by analyzing the spectral image acquired by the acquisition unit 52A. The shape information of the subject B is then derived from the specified result obtained by specifying the irradiation region E.

Detailed description will be provided below.

Figure 3A:
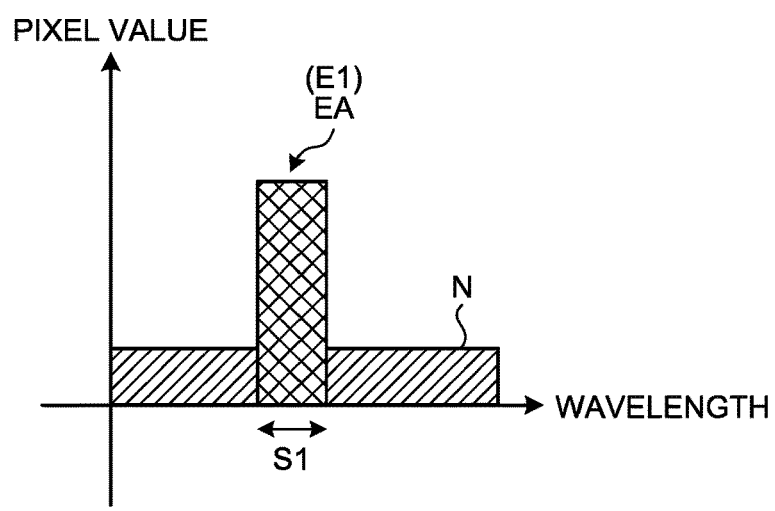
FIG. 3A is a diagram illustrating a wavelength spectrum of an irradiation region.
Figure 3B:
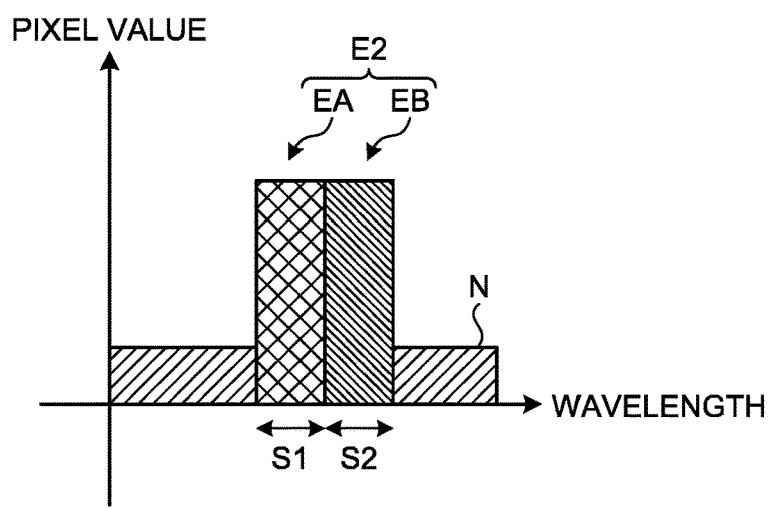
FIG. 3B is a diagram illustrating the wavelength spectrum of the irradiation region.
Figure 3C:
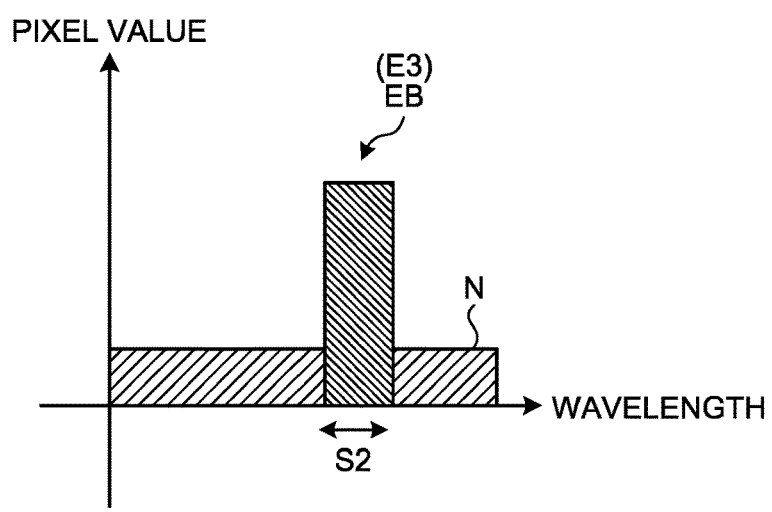
FIG. 3C is a diagram illustrating the wavelength spectrum of the irradiation region.

FIG. 3A to FIG. 3C are diagrams illustrating an example of a wavelength spectrum of each of the first irradiation region E1, the second irradiation region E2, and the third irradiation region E3. In FIG. 3A to FIG. 3C, a horizontal axis indicates a wavelength, and a vertical axis indicates a pixel value. The pixel value may be normalized as needed.

FIG. 3A is a diagram illustrating an example of the wavelength spectrum of the first irradiation region E1. FIG. 3B is a diagram illustrating an example of the wavelength spectrum of the second irradiation region E2. FIG. 3C is a diagram illustrating an example of the wavelength spectrum of the third irradiation region E3.

FIG. 3A to FIG. 3C also illustrate background noise N. The background noise N is an example of a dark current component. In the present embodiment, the background noise N means a pixel value of the spectral image obtained by the imaging element 40 before the light source 10 is turned on to emit the light beam R. In other words, the background noise N is a pixel value of each pixel of the spectral image when the light source 10 is turned off.

As illustrated in FIG. 3A, regarding the first irradiation region E1, a pixel value equal to or larger than a first threshold is obtained for the first spectral beam L1 of a first wavelength region S1. As illustrated in FIG. 3B, regarding the second irradiation region E2, a pixel value equal to or larger than the first threshold is obtained for both of the first wavelength region S1 and a second wavelength region S2. As illustrated in FIG. 3C, regarding the third irradiation region E3, a pixel value equal to or larger than the first threshold is obtained for the second wavelength region S2. As the first threshold, a value with which light reception due to irradiation of the light beam R may be determined in advance.

As illustrated in FIG. 3A to FIG. 3C, it can be said that the first irradiation region E1, the second irradiation region E2, and the third irradiation region E3 can be distinguished from each other by combining both pixel values for the first wavelength region S1 and the second wavelength region S2.

On the other hand, even if only the pixel value for the first wavelength region S1 is analyzed, the first irradiation region E1 and the second irradiation region E2 cannot be distinguished from each other (refer to FIG. 3A). Even if only the pixel value for the second wavelength region S2 is analyzed, the first irradiation region E1 and the second irradiation region E2 cannot be distinguished from each other (refer to FIG. 3C). That is, only by using a combination of the pixel values for both of the first wavelength region S1 and the second wavelength region S2, the first irradiation region E1, the second irradiation region E2, and the third irradiation region E3 can be distinguished from each other.

Returning to FIG. 2, the description will be continued. The deriving unit 52B then specifies the irradiation region E irradiated with each of the first spectral beam L1 and the second spectral beam L2 on the subject B based on a first pixel value of the first wavelength region S1 and a second pixel value of the second wavelength region S2 included in the spectral image. The first pixel value is an example of first received light intensity. The second pixel value is an example of second received light intensity.

Specifically, the deriving unit 52B specifies each of the first irradiation region E1, the second irradiation region E2, and the third irradiation region E3 in the spectral image by using a combination of the pixel values for the first wavelength region S1 and the second wavelength region S2.

In other words, the deriving unit 52B can distinguish the first irradiation region E1, the second irradiation region E2, and the third irradiation region E3 from each other only by using a combination of the pixel values for the first wavelength region S1 and the second wavelength region S2. That is, the deriving unit 52B can distinguish the irradiation regions E from each other more finely.

The deriving unit 52B then derives the shape information of the subject B from the specified result of the irradiation region E.

To derive the shape information, a calculation method that is generally used for calculating a three-dimensional shape using structured illumination may be used, such as a phase shift method, a fringe projection method, and an optical cutting method. However, in this case, the shape includes a minute shape on a surface, that is, unevenness, a scratch, and the like. These minute shapes on the surface are also called a surface property. That is, the shape described herein is assumed to include the surface property.

In a case of deriving the shape information using structured illumination, derivation accuracy for the shape information is improved as a pattern of the irradiation region E is finer. In the present embodiment, the deriving unit 52B distinguishes the irradiation region E into the first irradiation region E1, the second irradiation region E2, and the third irradiation region E3 to be specified by using a combination of the pixel values for the first wavelength region S1 and the second wavelength region S2. The deriving unit 52B then derives the shape information of the subject B from the specified result.

Accordingly, as compared with a case of not using a combination of the pixel values for the first wavelength region S1 and the second wavelength region S2, the deriving unit 52B can derive the shape information of the subject B with higher accuracy.

In the present embodiment, the deriving unit 52B can fractionate the irradiation region E into the first irradiation region E1, the second irradiation region E2, and the third irradiation region E3 to be specified. This is because the second irradiation region E2, in which the respective irradiation regions E irradiated with the first spectral beam L1 and the second spectral beam L2 overlap with each other, is formed on the subject B by using the light source 10 including the light emitting surface 11 having the finite size. As such, in the present embodiment, the shape information can be derived with much higher accuracy by using the light source 10 including the light emitting surface 11 having the finite size and using a combination of the pixel values for the first wavelength region S1 and the second wavelength region S2.

By making the size of the first wavelength selection region 31A to be the same as the size of the second wavelength selection region 31B, the first irradiation region E1 and the third irradiation region E3 can have substantially the same size. Accordingly, at the time of specifying the first irradiation region E1 and the third irradiation region E3 to calculate the shape information, substantially the same shape accuracy can be obtained for the respective irradiation regions. That is, an effect of reducing variation in shape accuracy can be obtained.

It is assumed that the size of the light emitting surface 11 is S0, the size of the first wavelength selection region 31A is S1, the size of the second wavelength selection region 31B is S2, a distance from the light selection unit 30 to the light source is D0, and a distance from the light selection unit 30 to the irradiation region is D1. In this case, a size SE1 of the first irradiation region E1, a size SE2 of the second irradiation region E2, and a size SE3 of the third irradiation region E3 are respectively represented by the following expression (1), expression (2), and expression (3).

$$SE1 = S1 \times D1/D0 \quad (1)$$

$$SE2 = S0 \times D1/D0 \quad (2)$$

$$SE3 = S2 \times D1/D0 \quad (3)$$

In this case, when the size S0 of the light emitting surface 11 is represented by the following expression (4), the first irradiation region E1 and the second irradiation region E2 can have substantially the same size.

$$S0 = S1 \quad (4)$$

Accordingly, at the time of specifying the first irradiation region E1 and the second irradiation region E2 and calculating the shape information, shape accuracy in the respective irradiation regions can be substantially the same. That is, an effect of reducing variation in shape accuracy is obtained.

When the size of the first wavelength selection region 31A and the size of the second wavelength selection region 31B are made to be the same, and the size S0 of the light emitting surface 11 is made to be larger than the above sizes, that is, the following expression (5) is established, the size SE1 of the first irradiation region E1 and the size SE2 of the second irradiation region E2 can be made to be the same.

$$S0 > S1 = S2 \quad (5)$$

Furthermore, an effect of obtaining higher brightness is obtained because the light emitting surface 11 is large. As the brightness increases, a signal-to-noise ratio (S/N) at the time of imaging is improved. That is, an effect of reducing variation in shape accuracy can be obtained.

The deriving unit 52B preferably derives the shape information based on the first pixel value of the first wavelength region S1 and the second pixel value of the second wavelength region S2 after removing the background noise N as an example of a dark current component.

First, the deriving unit 52B compares a combination of the pixel values for the first wavelength region S1 and the second wavelength region S2 with the background noise N. Specifically, the deriving unit 52B determines whether each of the pixel values for the first wavelength region S1 and the second wavelength region S2 is larger than a pixel value of the background noise N. Through this determining processing, for example, the deriving unit 52B can prevent the irradiation region EB irradiated with the second spectral beam L2 from being regarded as being present in the first irradiation region E1. In the present embodiment, the deriving unit 52B removes the pixel value of the background noise N from each of the pixel values of the first wavelength region S1 and the second wavelength region S2. The pixel value of the background noise N may be measured in advance, and stored in the storage unit 54. The deriving unit 52B then specifies the irradiation region E using a combination of the pixel values for the respective first wavelength region S1 and the second wavelength region S2 after removing the background noise N.

By specifying the irradiation regions E (the first irradiation region E1, the second irradiation region E2, and the third irradiation region E3) using the pixel values of the respective first wavelength region S1 and the second wavelength region S2 from which the background noise N is removed, erroneous recognition of the irradiation region E can be reduced. By deriving the shape information using this specified result, the deriving unit 52B can reduce a derivation error of the shape information of the subject B.

Next, the following describes the output control unit 52C. The output control unit 52C outputs a derivation result of the shape information obtained by the deriving unit 52B to the output unit 56.

Figure 4:
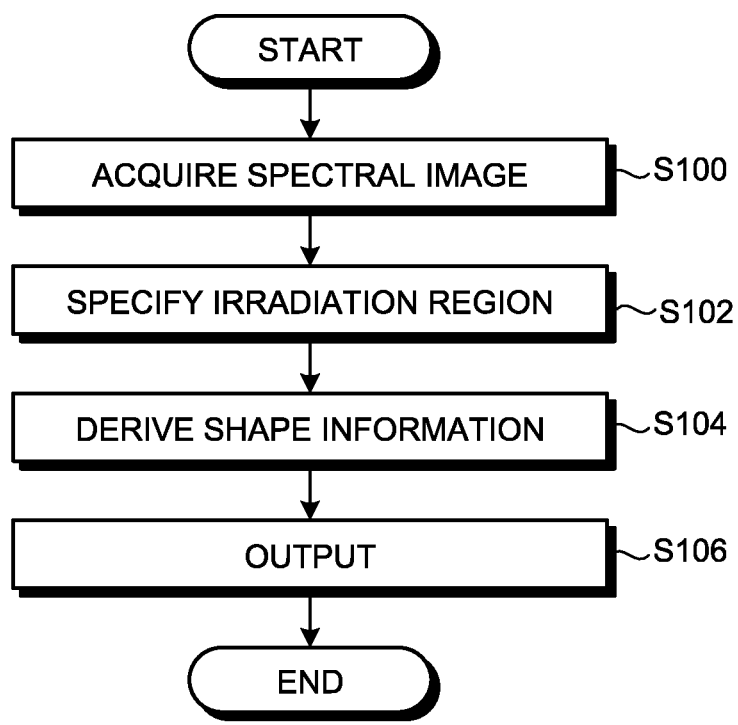
FIG. 4 is a flowchart of an information processing procedure.

Next, the following describes an example of an information processing procedure performed by the information processing device 50. FIG. 4 is a flowchart illustrating an example of the information processing procedure performed by the information processing device 50.

First, the acquisition unit 52A acquires the spectral image from the imaging element 40 (Step S100).

The deriving unit 52B specifies the irradiation region E irradiated with each of the first spectral beam L1 and the second spectral beam L2 on the subject B based on the first pixel value for the first wavelength region S1 and the second pixel value for the second wavelength region S2 included in the spectral image acquired at Step S100 (Step S102).

The deriving unit 52B derives the shape information of the subject B from the specified result specified at Step S102 (Step S104).

The output control unit 52C outputs the derivation result at Step S104 to the output unit 56 (Step S106). This routine is then ended.

As described above, the optical device 1A according to the present embodiment includes the light selection unit 30, the imaging element 40, and the deriving unit 52B. The light selection unit 30 splits the irradiated light beam R into a plurality of the spectral beams L of different wavelength regions. The imaging element 40 captures the subject B irradiated with the spectral beams L, and acquires the spectral image. The deriving unit 52B derives the shape information of the subject B from the specified result obtained by specifying the irradiation region E irradiated with each of the spectral beams L on the subject B based on the received light intensity of each of the spectral beams L included in the spectral image.

In this way, the optical device 1A according to the present embodiment irradiates the subject B with the different spectral beams L that are split by the light selection unit 30. The deriving unit 52B then specifies the irradiation region E irradiated with each of the spectral beams L on the subject B based on a spectral image as a captured image of the subject B captured by the imaging element 40. That is, by using a combination of the pixel values for the respective different wavelength regions, the deriving unit 52B can distinguish the irradiation regions E irradiated with the spectral beams L of the wavelength regions from each other more finely. The deriving unit 52B then derives the shape information of the subject B from the specified result of the irradiation region E.

Thus, the optical device 1A according to the present embodiment can derive the shape information of the subject B with high accuracy.

Second Embodiment

The present embodiment describes a configuration further including an optical element in addition to the configuration of the optical device 1A according to the first embodiment described above.

Figure 5:
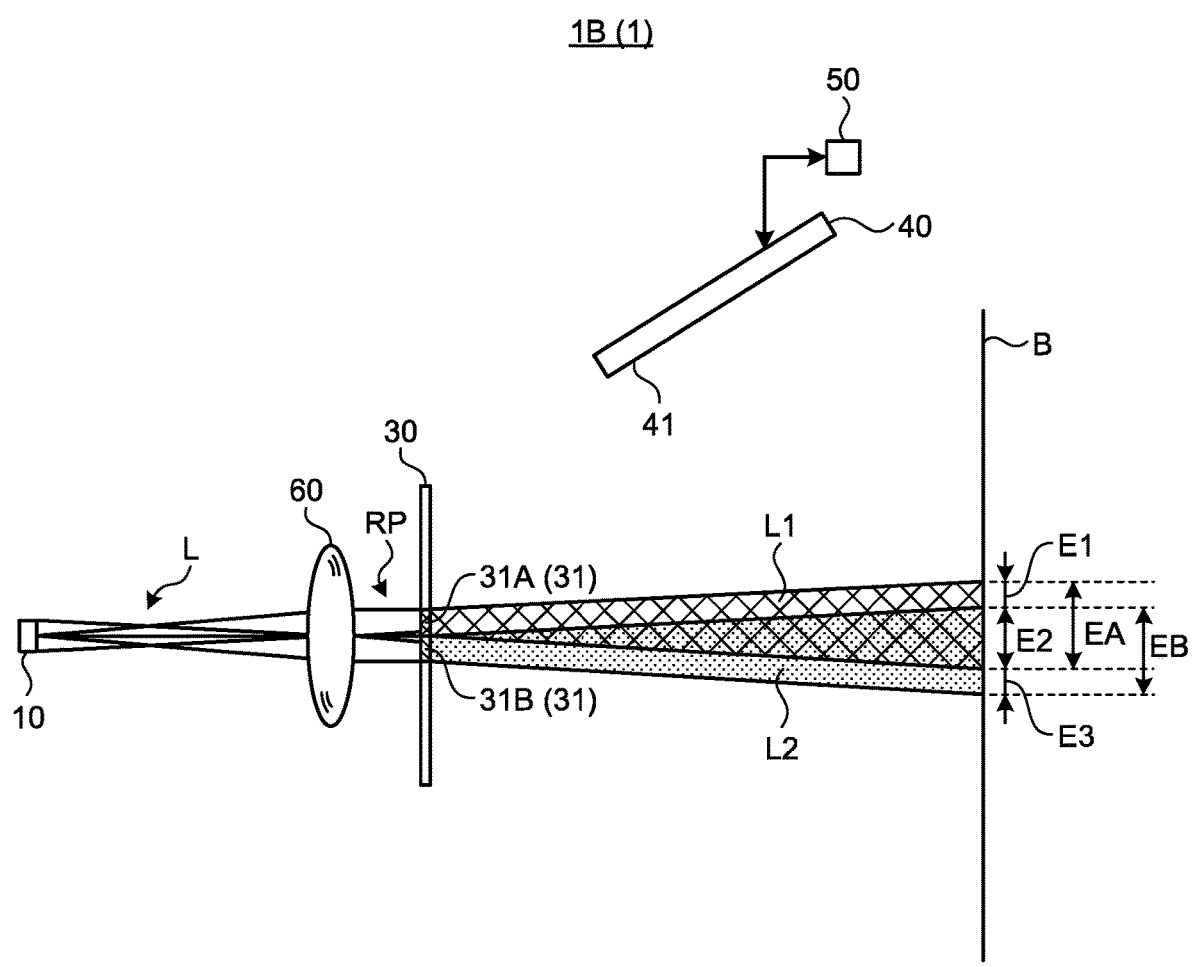
FIG. 5 is a schematic diagram of an optical device.

FIG. 5 is a schematic diagram illustrating an example of an optical device 1B according to the present embodiment. The optical device 1B has a configuration further including a lens 60 in addition to the configuration of the optical device 1A.

The lens 60 is an example of an optical element. The optical element reduces an angle of divergence of the light beam R emitted from the light source 10. Specifically, the optical element causes divergent light as the light beam R emitted from the light source 10 to be quasi-parallel light.

The quasi-parallel light means light obtained by making a full divergent angle of the divergent light as the light beam R emitted from the light source 10 to be equal to or smaller than 1 milliradian (mrad). Accordingly, the quasi-parallel light includes parallel light.

The present embodiment describes a case in which the optical element is the lens 60, as an example. As the optical element, a concave mirror may be used in place of the lens 60.

The lens 60 is disposed between the light source 10 and the light selection unit 30. Similarly to the first embodiment, the following describes a case in which the light source 10 is an LED, as an example.

In this case, the lens 60 has a focal point. The light source 10 is disposed in a focal point region of the lens 60. The focal point region means the focal point of the lens 60, or a vicinity of the focal point. By disposing the light source 10 in this way, the light beam R irradiated from the light source 10 passes through the lens 60 to be the quasi-parallel light, and reaches the light selection unit 30.

As described above in the first embodiment, the light emitting surface 11 of the light source 10 has the finite size. Accordingly, the light beam R irradiated from the light source 10 becomes slightly divergent light. The full divergent angle of this divergent light is represented by the following expression (6). Also in a case of using a concave mirror in place of the lens 60, the following expression (6) is established.

$$\Theta = D/f \qquad (6)$$

In the expression (6), $\Theta$ is the full divergent angle. f indicates a focal distance of the lens 60. D indicates the size of the light emitting surface 11 of the light source 10.

For example, assuming that the focal distance f is 200 mm, the full divergent angle $\Theta$ is 1 milliradian (mrad). Thus, it can be said that the divergent light can be made to be the quasi-parallel light by the lens 60.

Next, the following describes an optical effect of the optical device 1B.

The light beam R emitted from the light source 10 as the LED is generally divergent light, and light distribution thereof is substantially Lambertian distribution. That is, the light beam R emitted from the light source 10 is a fan light beam. The fan light beam means that the light beam is spreading like a fan. In the present embodiment, the light beam R as the fan light beam passes through the lens 60 to be quasi-parallel light RP having a small angle of divergence, and reaches the subject B via the light selection unit 30. Accordingly, as compared with a case of irradiating the subject B with the fan light beam, the irradiation region E on the subject B can be narrowed.

Similarly to the first embodiment, the deriving unit 52B distinguishes the first irradiation region E1, the second irradiation region E2, and the third irradiation region E3 from each other by combining both of the pixel values for the first wavelength region S1 and the second wavelength region S2. That is, by using a combination of the pixel values for the first wavelength region S1 and the second wavelength region S2 included in the spectral image, the deriving unit 52B distinguishes the first irradiation region E1, the second irradiation region E2, and the third irradiation region E3 from each other to be specified in the spectral image.

In a case in which the deriving unit 52B derives the shape information using such structured illumination, derivation accuracy for the shape information is improved as a pattern of the irradiation region E is finer. Accordingly, similarly to the embodiment described above, the optical device 1B according to the present embodiment can derive the shape information of the subject B with high accuracy.

The optical device 1B according to the present embodiment irradiates the subject B with the quasi-parallel light RP obtained by the lens 60 via the light selection unit 30. Accordingly, the irradiation region E on the subject B can be narrowed as compared with a case of not using the lens 60. Accordingly, with the optical device 1B according to the present embodiment, the irradiation regions E (the first irradiation region E1, the second irradiation region E2, and the third irradiation region E3) having a finer pattern can be formed on the subject B.

Thus, with the optical device 1B according to the present embodiment, the shape information of the subject B can be derived with much higher accuracy in addition to the effect of the first embodiment described above.

Third Embodiment

The present embodiment describes a case of using a diffraction grating as the light selection unit 30 of the optical device 1B according to the second embodiment described above.

FIG. 6 is a schematic diagram illustrating an example of an optical device 1C according to the present embodiment. The optical device 1C has a configuration including a diffraction grating 34 in place of the light selection unit 30 of the optical device 1B according to the second embodiment described above. The optical device 1C further includes an opening member 32. The optical device 1C also includes a lens 62 in place of the lens 60.

The diffraction grating 34 is an example of a light selection unit. In the present embodiment, the diffraction grating 34 causes the light beams R of different wavelength regions to pass therethrough in different directions. Specifically, the diffraction grating 34 splits the irradiated light beam R into a plurality of the spectral beams L of different wavelength regions. The present embodiment describes a case in which the diffraction grating 34 splits the irradiated light beam R into the first spectral beam L1 of the first wavelength region S1, the second spectral beam L2 of the second wavelength region S2, and a third spectral beam L3 of a third wavelength region, as an example. The first wavelength region S1, the second wavelength region S2, and the third wavelength region are different wavelength regions.

The diffraction grating 34 is configured such that projecting parts are formed at pitches H of regular intervals on a glass substrate having a planar shape, for example. However, it is sufficient that the diffraction grating 34 has a configuration having a function as the diffraction grating, and is not limited to the above configuration.

The opening member 32 is disposed between the light source 10 and the lens 60. Similarly to the first embodiment, the present embodiment describes a case in which the light source 10 is an LED, as an example. The present embodiment also describes a case in which the size of the light emitting surface 11 of the light source 10 is equal to or smaller than 0.1 mm, as an example. Specifically, the present embodiment describes a case in which the size of the light emitting surface 11 of the light source 10 is assumed to be 0.1 mm×0.1 mm. The size of the light emitting surface 11 is not limited thereto.

The opening member 32 includes an opening 32A. The opening 32A is assumed to be a pinhole having a diameter of 0.1 mm, for example. The size of the opening 32A is not limited thereto.

The lens 62 is similar to the lens 60 according to the second embodiment. The lens 62 is disposed between the opening member 32 and the diffraction grating 34. Similarly to the second embodiment, a concave mirror may be used in place of the lens 62.

The opening 32A of the opening member 32 is disposed at a focal position of the lens 62, or substantially in the vicinity of the focal position. Due to such arrangement, the light beam R irradiated from the light source 10 passes through the opening 32A and the lens 62 to be the quasi-parallel light RP, and reaches the diffraction grating 34.

As described above in the second embodiment, the full divergent angle of the divergent light as the light beam R emitted from the light source 10 is represented by the expression (6) described above. In the present embodiment, D in the expression (6) indicates the size of the opening 32A.

For example, the focal distance f of the lens 62 is assumed to be 500 mm. As described above, in the present embodiment, the size of the opening 32A is assumed to have a diameter of 0.1 mm. In this case, the full divergent angle Θ is 0.2 milliradian (mrad). Accordingly, it can be said that the divergent light can be made to be the quasi-parallel light RP by the opening 32A and the lens 62.

Next, the following describes an optical effect of the optical device 1C.

The light beam R emitted from the light source 10 as an LED is generally divergent light, and light distribution thereof is substantially Lambertian distribution. That is, the light beam R emitted from the light source 10 is a fan light beam. In the present embodiment, the light beam R as the fan light beam passes through the opening 32A and the lens 62 to be the quasi-parallel light RP having a small angle of divergence, and reaches the diffraction grating 34.

In this case, the quasi-parallel light RP is generated because the focal distance of the lens 62 is sufficiently larger with respect to the size of the light emitting surface 11 or the opening 32A. A distance between light beams adjacent to each other in a direction orthogonal to the optical axis Z included in the light beam R that passes through the lens 62 to be the quasi-parallel light RP is substantially constant along the optical axis Z. That is, these adjacent light beams reach the diffraction grating 34 without being brought into contact with each other.

In the present embodiment, the spectral beams L of different wavelength regions (the first spectral beam L1, the second spectral beam L2, and a third light beam R3) are irradiated to the subject B by the diffraction grating 34. Accordingly, by combining the pixel values for the respective wavelength regions, the deriving unit 52B can distinguish more irradiation regions E from each other.

FIG. 6 illustrates the first irradiation region E1, the second irradiation region E2, and the third irradiation region E3, as an example. In the present embodiment, the first irradiation region E1 is a region on the subject B to which only the first spectral beam L1 of the first wavelength region S1 is irradiated. The second irradiation region E2 is a region on the subject B to which the first spectral beam L1 of the first wavelength region and the second spectral beam L2 of the second wavelength region are irradiated in an overlapping manner. The third irradiation region E3 is a region on the subject B to which only the second spectral beam L2 is irradiated.

In this case, the light beam R having a wavelength λ is assumed to be incident at an incidence angle α with respect to a normal line on a surface or a back surface of the glass substrate of the diffraction grating 34. An angle of a light beam direction of the spectral beam L as the light beam R transmitted through the diffraction grating 34 with respect to the normal line on the surface or the back surface of the glass substrate is assumed to be β. Accordingly, the following expression (7) is established.

$$\sin \beta - \sin \alpha = m \times \lambda / H \qquad (7)$$

In the expression (7), H indicates the pitch H of the diffraction grating 34. m indicates an integral number equal to or larger than 1.

In the present embodiment, the quasi-parallel light RP is incident on the diffraction grating 34. Accordingly, the incidence angle α is substantially 0. In a case in which the light beam R other than the quasi-parallel light RP is incident on the diffraction grating 34, the light beams R at various angles are incident on the diffraction grating 34. In this case, as represented by the expression (7) described above, the light beams R of various wavelength regions are transmitted in various directions, and reach the subject B in a state of color-mixed state. Accordingly, in a case in which the light beam R other than the quasi-parallel light RP is incident on the diffraction grating 34, the deriving unit 52B hardly distinguishes the irradiation regions E from each other in accordance with the wavelength.

On the other hand, in the present embodiment, the quasi-parallel light RP is incident on the diffraction grating 34 due to the opening 32A and the lens 62. Accordingly, the deriving unit 52B can specify the irradiation region E irradiated with each of the spectral beams L of different wavelength regions on the subject B by analyzing the spectral image in accordance with the wavelength. That is, the deriving unit 52B is enabled to easily distinguish the first irradiation region E1, the second irradiation region E2, and the third irradiation region E3 from each other in accordance with the wavelength region.

As described above, an angle β of the spectral beam L that passes through the diffraction grating 34 is represented by the expression (7) described above. In the expression (7) described above, if m is 1 or −1, the diffraction grating 34 can be made to be strong. The spectral beam L that passes through the diffraction grating 34 is referred to as ±1st-order diffracted light. A passing angle of the ±1st-order diffracted light is represented by the following expression (8).

$$\sin \beta = \pm \lambda / H \qquad (8)$$

As represented by the expression (8), the angle of the spectral beam L transmitted through the diffraction grating 34 is increased as the wavelength is larger. That is, a direction, that is, an angle of the spectral beam L can be made to be different depending on the wavelength of the spectral beam L by the diffraction grating 34.

For example, the pitch H of the diffraction grating 34 is assumed to be 2 μm. The first wavelength region S1 is assumed to be 650 nm, the second wavelength region S2 is assumed to be 640 nm, and the third wavelength region is assumed to be 640 nm.

Figure 7A:
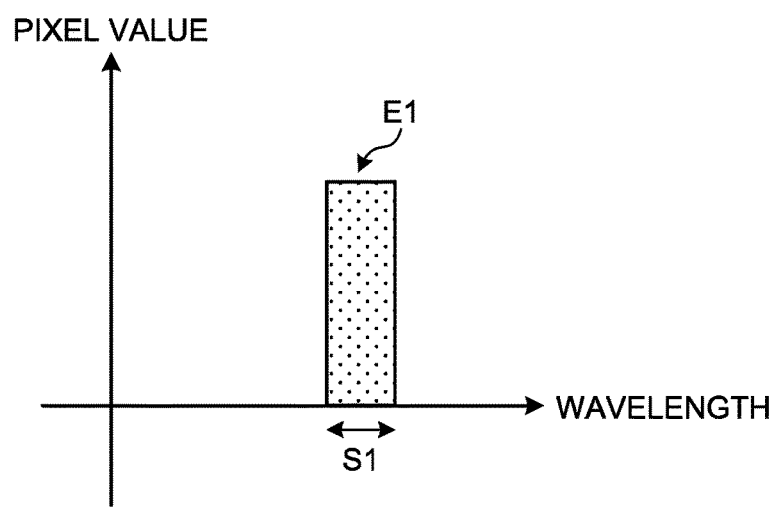
FIG. 7A is a diagram illustrating the wavelength spectrum of the irradiation region.
Figure 7B:
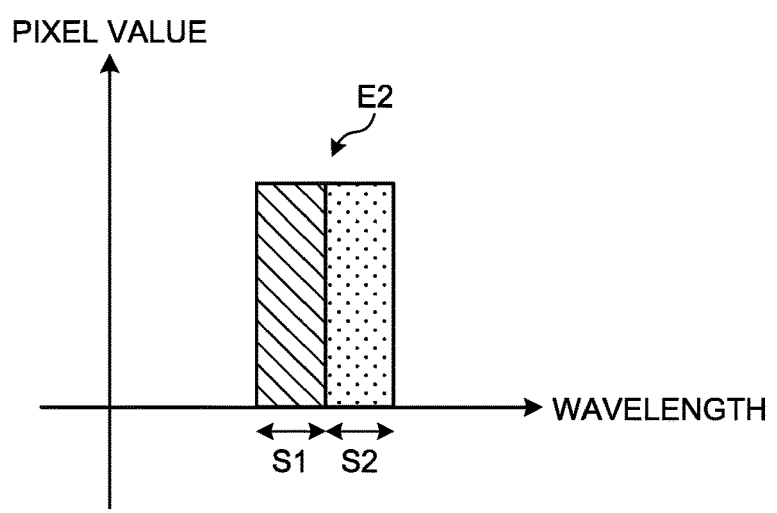
FIG. 7B is a diagram illustrating the wavelength spectrum of the irradiation region.
Figure 7C:
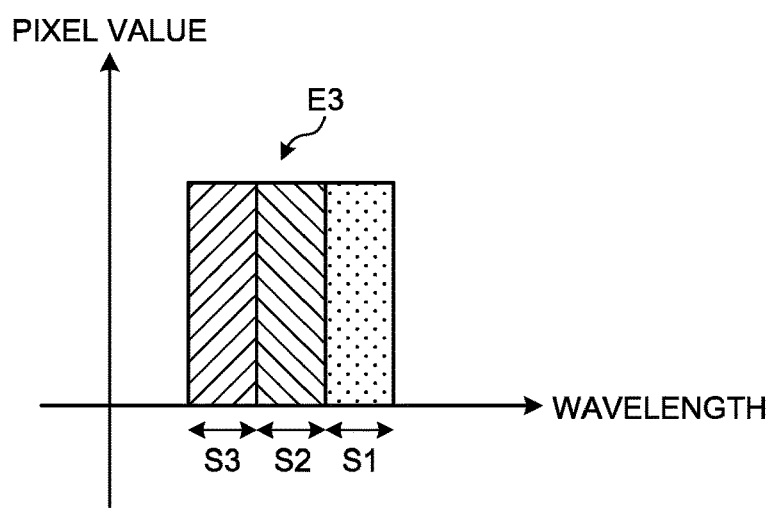
FIG. 7C is a diagram illustrating the wavelength spectrum of the irradiation region.

FIG. 7A to FIG. 7C are diagrams illustrating an example of the wavelength spectrum of each of the first irradiation region E1, the second irradiation region E2, and the third irradiation region E3. In FIG. 7A to FIG. 7C, a horizontal axis indicates the wavelength, and a vertical axis indicates the pixel value. The pixel value may be normalized as needed.

FIG. 7A is a diagram illustrating an example of the wavelength spectrum of the first irradiation region E1. FIG. 7B is a diagram illustrating an example of the wavelength spectrum of the second irradiation region E2. FIG. 7C is a diagram illustrating an example of the wavelength spectrum of the third irradiation region E3.

As illustrated in FIG. 7A to FIG. 7C, it can be said that the first irradiation region E1, the second irradiation region E2, and the third irradiation region E3 can be distinguished from each other by combining the respective pixel values for the first wavelength region S1, the second wavelength region S2, and the third wavelength region S3.

Thus, in the present embodiment, it can be said that the deriving unit 52B can distinguish the first irradiation region E1, the second irradiation region E2, and the third irradiation region E3 from each other by combining the respective pixel values for the first wavelength region S1, the second wavelength region S2, and the third wavelength region S3.

On the other hand, even if only the pixel value for the first wavelength region S1 is analyzed, the first irradiation region E1 cannot be distinguished from the second irradiation region E2 and the third irradiation region E3. Even if only the pixel value for the third wavelength region S3 is analyzed, the third irradiation region E3 cannot be distinguished from the first irradiation region E1 and the second irradiation region E2.

That is, the first irradiation region E1, the second irradiation region E2, and the third irradiation region E3 can be distinguished from each other only by using a combination of the respective pixel values for the first wavelength region S1, the second wavelength region S2, and the third wavelength region S3.

Thus, in the present embodiment, the deriving unit 52B specifies the irradiation region E irradiated with each of the first spectral beam L1, the second spectral beam L2, and the third light beam R3 on the subject B based on the first pixel value for the first wavelength region S1, the second pixel value for the second wavelength region S2, and a third pixel value for the third wavelength region S3 included in the spectral image.

Specifically, the deriving unit 52B specifies the first irradiation region E1, the second irradiation region E2, and the third irradiation region E3 in the spectral image by using a combination of the respective pixel values for the first wavelength region S1, the second wavelength region S2, and the third wavelength region S3.

In other words, the deriving unit 52B can distinguish the first irradiation region E1, the second irradiation region E2, and the third irradiation region E3 from each other only by using a combination of the respective pixel values for the first wavelength region S1, the second wavelength region S2, and the third wavelength region S3. That is, the deriving unit 52B can distinguish the irradiation regions E from each other more finely.

The deriving unit 52B then derives the shape information of the subject B from the specified result of the irradiation region E. In other words, the deriving unit 52B can distinguish the first irradiation region E1, the second irradiation region E2, and the third irradiation region E3 from each other only by using a combination of the respective pixel values for the first wavelength region S1 and the second wavelength region S2. That is, the deriving unit 52B can distinguish the irradiation regions E from each other more finely. The deriving unit 52B then derives the shape information of the subject B from the specified result of the irradiation region E.

As described above, in a case in which the deriving unit 52B derives the shape information using such structured illumination, derivation accuracy for the shape information is improved as a pattern of the irradiation region E is finer.

In the present embodiment, the light beams that are adjacent to each other in a direction orthogonal to the optical axis Z included in the light beam R that passes through the lens 62 to be the quasi-parallel light RP reach the subject B via the diffraction grating 34 without being brought into contact with each other. By making the quasi-parallel light, fine structured illumination independent of a distance can be implemented. Accordingly, in the present embodiment, illumination having a finer structure can be made, and distribution of the irradiation region E having a finer structure can be implemented as compared with the embodiment described above.

In the present embodiment, the deriving unit 52B can distinguish the irradiation regions E from each other as the first irradiation region E1, the second irradiation region E2, and the third irradiation region E3 to be specified by using a combination of the respective pixel values for the first wavelength region S1, the second wavelength region S2, and the third wavelength region S3. Accordingly, as compared with a case of not using a combination of the respective pixel values for the first wavelength region S1, the second wavelength region S2, and the third wavelength region S3, the deriving unit 52B can derive the shape information with higher accuracy.

Thus, with the optical device 1C according to the present embodiment, the shape information of the subject B can be derived with much higher accuracy in addition to the effect of the embodiment described above.

Fourth Embodiment

The present embodiment describes a configuration further including a unique optical element in addition to the optical device 1A according to the first embodiment described above.

Figure 8:
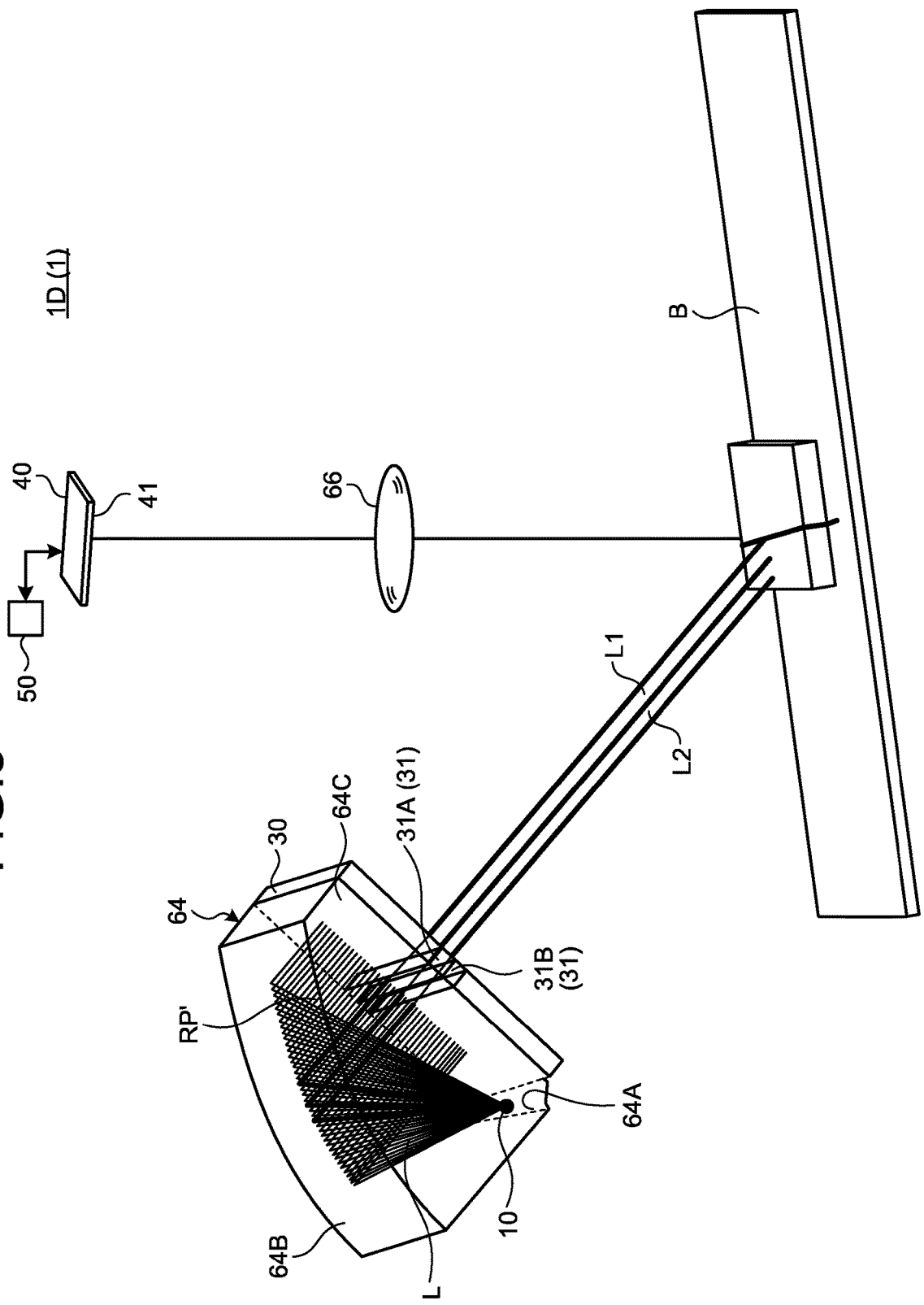
FIG. 8 is a schematic diagram of the optical device.

FIG. 8 is a schematic diagram illustrating an example of an optical device 1D according to the present embodiment. The optical device 1D has a configuration further including an optical element 64 and a lens 66 in addition to the configuration of the optical device 1A.

The lens 66 forms an image of the light beam R reflected by the subject B on a light receiving surface 41 of the imaging element 40.

The optical element 64 contains a transparent medium. "Transparent" means being transparent with respect to the incident light beam R. The transparent medium is, for example, glass, resin, quartz, sapphire, and the like. The resin is, for example, acrylic, polycarbonate, and the like. The present embodiment describes a case in which the transparent medium contained in the optical element 64 is acrylic, as an example.

The optical element 64 includes a reflective surface 64B, an incident surface 64A, and an emitting surface 64C on an outer surface of the transparent medium.

The reflective surface 64B is a reflective surface having a paraboloid shape or a quasi-paraboloid shape disposed on the outer surface of the transparent medium. The reflective surface 64B is, for example, a surface obtained by subjecting a paraboloid constituting part of the outer surface of the transparent medium to aluminum vapor deposition. Accordingly, the reflective surface 64B functions as a reflective surface that reflects the light beam R. The present embodiment describes a case in which a focal distance of the reflective surface 64B is assumed to be 100 mm.

The incident surface 64A is a surface having a planar shape and being opposed to the reflective surface 64B, and disposed on the light emitting surface 11 of the light source 10. The incident surface 64A is disposed in the vicinity of a focal position of the reflective surface 64B as a paraboloid. The light emitting surface 11 of the light source 10 and the incident surface 64A are disposed to be opposed to each other.

The emitting surface 64C is disposed to be opposed to the light selection unit 30.

The LED as the light source 10 according to the present embodiment will be described assuming that the size of the light emitting surface 11 is 0.1 mm×0.1 mm.

The light beam R that is emitted from the light source 10 and incident on the incident surface 64A of the optical element 64 is refracted due to a refraction effect of the transparent medium, and is incident on an inner part of the transparent medium. Substantially all of the light beams R that are incident on the inner part of the transparent medium are guided in the transparent medium, and all of the guided light beams R are regularly reflected by the reflective surface 64B.

In this case, if there is no refraction effect of the transparent medium, the light beam R is not refracted. Accordingly, the light beams R spread like a fan light beam, and the light beams R that do not hit the reflective surface 64B and result in a loss are increased.

On the other hand, in the present embodiment, due to a light guiding effect of the optical element 64, substantially all of the light beams R can be reflected by the reflective surface 64B as a compact paraboloid toward the subject B via the light selection unit 30.

As described above, the light source 10 is disposed at the focal point of the reflective surface 64B or in the vicinity of the focal point. Accordingly, the light beam R reflected by the reflective surface 64B becomes parallel light RP'. That is, a distance between light beams that are adjacent to each other in a direction orthogonal to the optical axis Z becomes substantially constant along the optical axis Z, the light beams being included in the light beams R that are made to be the parallel light RP by passing through the optical element 64. That is, these adjacent light beams reach the light selection unit 30 without being brought into contact with each other.

By making the parallel light RP', fine structured illumination independent of a distance can be implemented. Accordingly, in the present embodiment, illumination having a finer structure can be made, and distribution of the irradiation region E having a finer structure can be implemented as compared with the embodiment described above.

Figure 9:
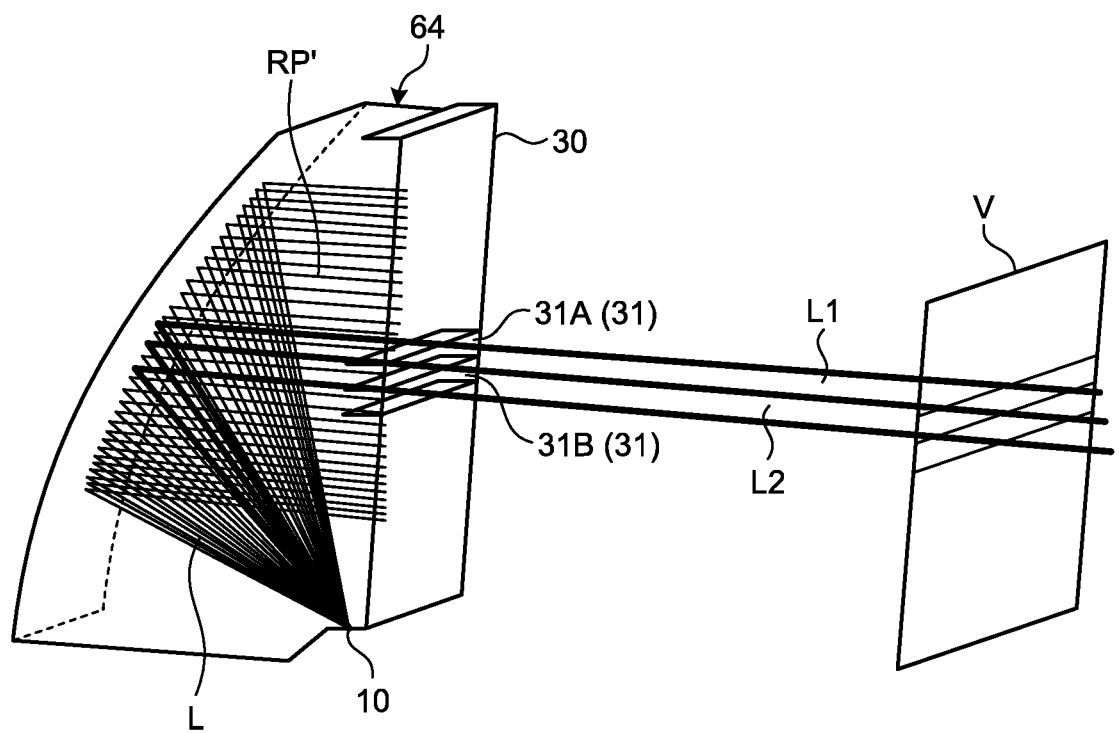
FIG. 9 is a schematic diagram illustrating intensity distribution of a spectral beam.

The parallel light RP' irradiated to the light selection unit 30 passes through the light selection unit 30 to be split, and reaches the subject B. FIG. 9 is a schematic diagram illustrating an example of intensity distribution V of the spectral beam L at a certain position on the optical path of the spectral beam L. When the spectral beam L is irradiated to the subject B and imaging is performed by the imaging element 40, the imaging element 40 obtains the spectral image.

Similarly to the first embodiment, the deriving unit 52B specifies the irradiation region E irradiated with each of the light beams R of different wavelength regions on the subject B based on each of the pixel values of different wavelength regions included in the spectral image. The shape information of the subject B is then derived from the specified result.

Figure 10A:
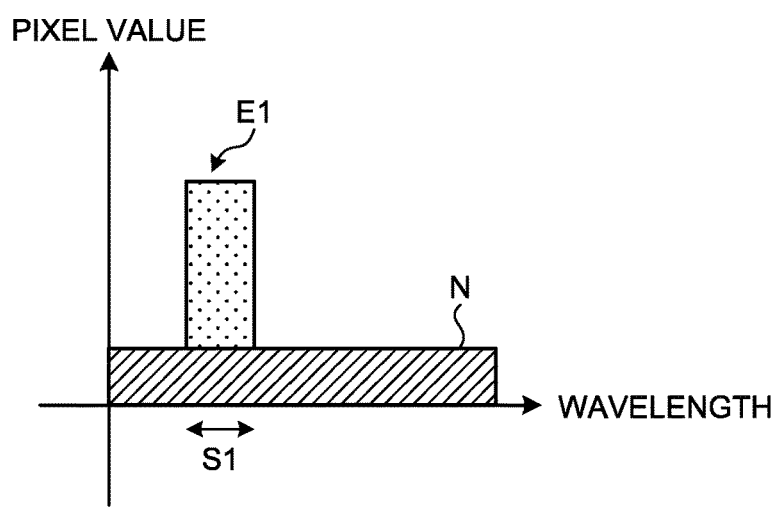
FIG. 10A is a diagram illustrating the wavelength spectrum of the irradiation region.
Figure 10B:
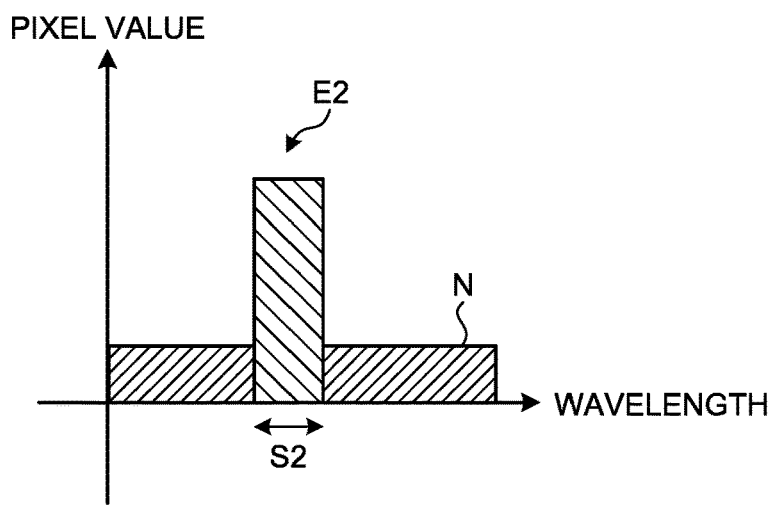
FIG. 10B is a diagram illustrating the wavelength spectrum of the irradiation region.
Figure 10C:
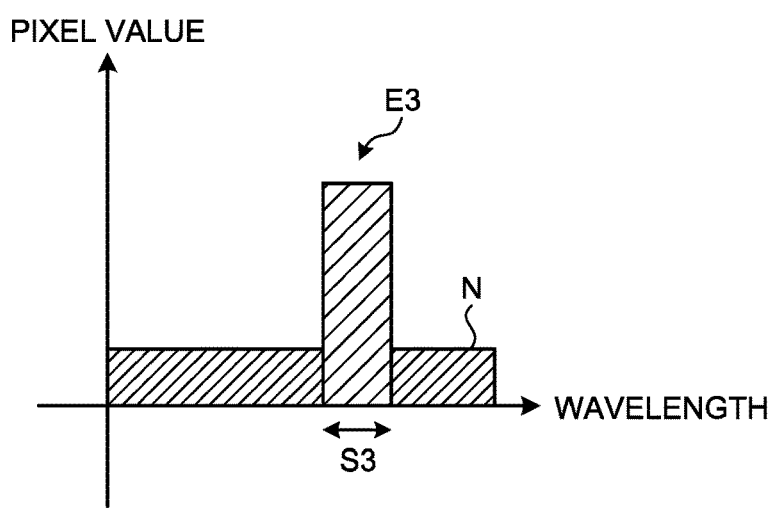
FIG. 10C is a diagram illustrating the wavelength spectrum of the irradiation region.

FIG. 10A to FIG. 10C are diagrams illustrating an example of the wavelength spectrum of each of the first irradiation region E1, the second irradiation region E2, and the third irradiation region E3. In FIG. 10A to FIG. 10C, a horizontal axis indicates the wavelength, and a vertical axis indicates the pixel value. The pixel value may be normalized as needed. FIG. 10A to FIG. 10C also illustrate the background noise N.

FIG. 10A is a diagram illustrating an example of the wavelength spectrum of the first irradiation region E1. FIG. 10B is a diagram illustrating an example of the wavelength spectrum of the second irradiation region E2. FIG. 10C is a diagram illustrating an example of the wavelength spectrum of the third irradiation region E3.

As illustrated in FIG. 10A to FIG. 10C, it can be said that the first irradiation region E1, the second irradiation region E2, and the third irradiation region E3 can be distinguished from each other by combining the respective pixel values for the first wavelength region S1, the second wavelength region S2, and the third wavelength region S3.

Accordingly, in the present embodiment, it can be said that the deriving unit 52B can distinguish the first irradiation region E1, the second irradiation region E2, and the third irradiation region E3 from each other by combining the respective pixel values for the first wavelength region S1, the second wavelength region S2, and the third wavelength region S3.

On the other hand, even if only the pixel value for the first wavelength region S1 is analyzed, the first irradiation region E1 cannot be distinguished from the second irradiation region E2 and the third irradiation region E3. Even if only the pixel value for the second wavelength region S2 is analyzed, the second irradiation region E2 cannot be distinguished from the first irradiation region E1 and the third irradiation region E3. Even if only the pixel value for the third wavelength region S3 is analyzed, the third irradiation region E3 cannot be distinguished from the first irradiation region E1 and the second irradiation region E2.

That is, the first irradiation region E1, the second irradiation region E2, and the third irradiation region E3 can be distinguished from each other only by using a combination of the respective pixel values for the first wavelength region S1, the second wavelength region S2, and the third wavelength region S3.

Thus, similarly to the embodiment described above, the deriving unit 52B specifies the irradiation region E irradiated with each of the first spectral beam L1, the second spectral beam L2, and the third light beam R3 on the subject B based on the first pixel value for the first wavelength region S1, the second pixel value for the second wavelength region S2, and the third pixel value for the third wavelength region S3 included in the spectral image. Specifically, the deriving unit 52B specifies the first irradiation region E1, the second irradiation region E2, and the third irradiation region E3 in the spectral image by using a combination of the respective pixel values for the first wavelength region S1, the second wavelength region S2, and the third wavelength region S3.

In other words, the deriving unit 52B can distinguish the first irradiation region E1, the second irradiation region E2, and the third irradiation region E3 from each other only by using a combination of the respective pixel values for the first wavelength region S1, the second wavelength region S2, and the third wavelength region S3. That is, the deriving unit 52B can distinguish the irradiation regions E from each other more finely.

The deriving unit 52B then derives the shape information of the subject B from the specified result of the irradiation region E.

As described above, in a case in which the deriving unit 52B derives the shape information using such structured illumination, derivation accuracy for the shape information is improved as a pattern of the irradiation region E is finer.

Thus, with the optical device 1D according to the present embodiment, the shape information of the subject B can be derived with much higher accuracy in addition to the effect of the first embodiment described above.

Similarly to the embodiment described above, the deriving unit 52B preferably derives the shape information based on the first pixel value for the first wavelength region S1, the second pixel value for the second wavelength region S2, and the third pixel value for the third wavelength region S3 after removing the background noise N.

Fifth Embodiment

The present embodiment describes a configuration further including a cylindrical lens.

FIG. 11 is a schematic diagram illustrating an example of an optical device 1E according to the present embodiment. The optical device 1E further includes a cylindrical lens 68 in addition to the configuration of the optical device 1A according to the first embodiment described above.

FIG. 11 is a schematic diagram illustrating an example of the optical device 1E according to the present embodiment. The optical device 1E has a configuration further including the cylindrical lens 68 in addition to the configuration of the optical device 1A.

The cylindrical lens 68 is an example of an optical element. The cylindrical lens 68 forms an image of the light beam R passed through the light selection unit 30 on the subject B. The optical device 1E may have a configuration including a concave mirror in place of the cylindrical lens 68. That is, the optical element used in the present embodiment may be an optical element that can define an image surface and an object surface of the subject B. The present embodiment describes a form of using the cylindrical lens 68 as the optical element, as an example.

Similarly to the first embodiment, an LED as the light source 10 according to the present embodiment may be an LED including the light emitting surface 11 having a finite size. The present embodiment describes a case in which the size of the light emitting surface 11 is assumed to be 3 mm×3 mm. The size of the light emitting surface 11 is not limited thereto.

In the present embodiment, the light selection unit 30 is disposed between the light source 10 and the cylindrical lens 68. In the present embodiment, the light selection unit 30 is disposed in the vicinity of the light emitting surface 11 of the light source 10 to be opposed thereto. The size of the wavelength selection region 31 in the light selection unit 30 is assumed to be substantially the same as the size of the light emitting surface 11 of the light source 10.

The wavelength selection region 31 of the light selection unit 30 is disposed on the object surface of the cylindrical lens 68. Accordingly, the wavelength selection region 31 is projected (illuminated) on the image surface of the cylindrical lens 68.

In this case, at a position closer to the cylindrical lens 68 side than the image surface of the cylindrical lens 68, respective projection images of the first wavelength selection region 31A and the second wavelength selection region 31B included in the wavelength selection region 31 become projection images that are projected in an overlapping manner.

An overlapping degree becomes higher as the position is closer to the cylindrical lens 68.

Figure 12A:
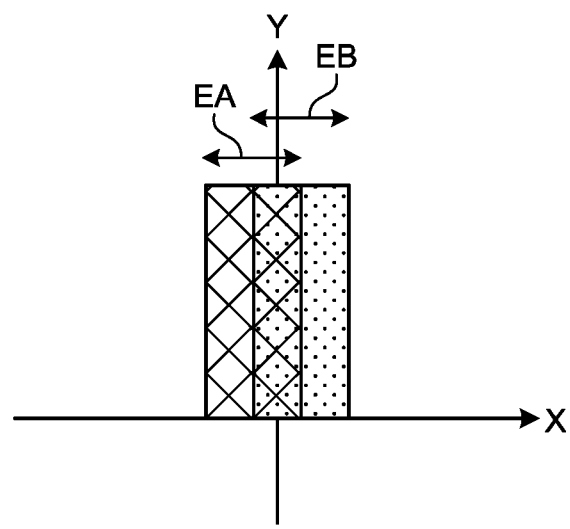
FIG. 12A is a diagram illustrating intensity distribution of a projection image.
Figure 12B:
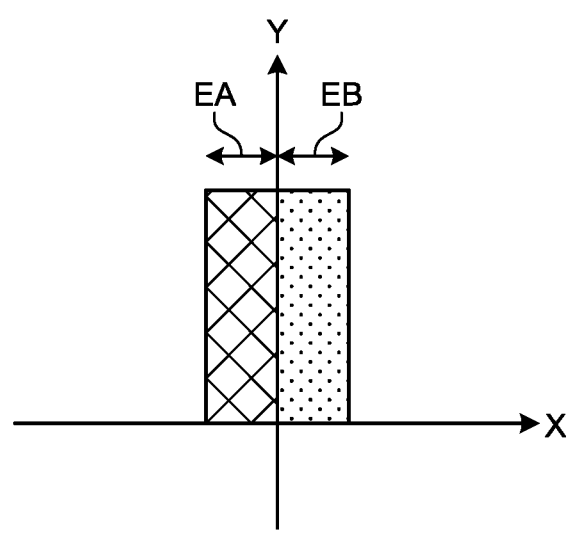
FIG. 12B is a diagram illustrating intensity distribution of the projection image.

FIG. 12A is a diagram illustrating an example of intensity distribution of the projection image at a position A1 in FIG. 11. FIG. 12B is a diagram illustrating an example of intensity distribution of the projection image at a position A2 in FIG. 11.

As illustrated in FIG. 11, FIG. 12A, and FIG. 12B, the overlapping degree between the irradiation region EA irradiated with the first spectral beam L1 that passes through the first wavelength selection region 31A and the irradiation region EB irradiated with the second spectral beam L2 becomes higher as the position is closer to the cylindrical lens 68. Accordingly, a distance in the optical axis Z-direction can be estimated from presence/absence of overlapping and a degree of overlapping between the irradiation region EA and the irradiation region EB respectively corresponding to the first wavelength selection region 31A and the second wavelength selection region 31B.

Thus, in the optical device 1E according to the present embodiment, similarly to the first embodiment, the deriving unit 52B specifies the irradiation region E irradiated with each of the first spectral beam L1 and the second spectral beam L2 on the subject B by analyzing the spectral image acquired by the acquisition unit 52A. The shape information of the subject B is then derived from the specified result obtained by specifying the irradiation region E.

At this point, in the present embodiment, the deriving unit 52B further estimates the distance in the optical axis Z-direction from presence/absence of overlapping and a degree of overlapping between the irradiation region EA and the irradiation region EB.

Accordingly, in the present embodiment, the deriving unit 52B can estimate a three-dimensional shape of the subject B.

Such distance estimation processing is implemented when the processing unit 52 holds a combination of both pixel values for the first wavelength region S1 and the second wavelength region S2 that are split by the wavelength selection region 31, and the deriving unit 52B estimates the distance using this combination.

That is, if an irradiation field (illumination distribution on a plane) is constituted of only two regions, that is, the irradiation region E in which the first spectral beam L1 of the first wavelength region S1 is present and the second spectral beam L2 of the second wavelength region S2 is not present, and the irradiation region E in which the second spectral beam L2 of the second wavelength region S2 is present and the first spectral beam L1 of the first wavelength region S1 is not present, the irradiation field is present on an image forming surface.

On the other hand, if there is a region in which both of them overlap with each other, that is, the irradiation region E in which the first spectral beam L1 of the first wavelength region S1 is present and the second spectral beam L2 of the second wavelength region S2 is present, it can be estimated that the region is closer to the cylindrical lens 68 side (optical element side) than the image forming surface.

Accordingly, with the optical device 1E according to the present embodiment, the three-dimensional shape of the subject B can be derived as the shape information in addition to the effect of the embodiment described above.

Next, the following describes an example of a hardware configuration of the information processing device 50 according to the embodiment described above.

Figure 13:
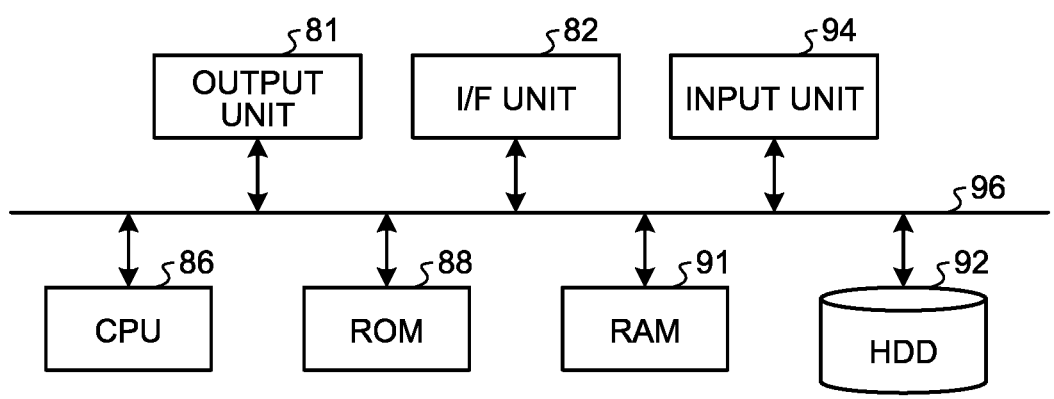
FIG. 13 is a hardware configuration diagram.

FIG. 13 illustrates an example of a hardware configuration diagram of the information processing device 50 according to the embodiments described above and modifications.

The information processing device 50 includes a control device such as a CPU 86, a storage device such as a read only memory (ROM) 88, a random access memory (RAM) 91, and a hard disk drive (HDD) 92, an I/F unit 82 as an interface for various appliances, an output unit 81 that outputs various kinds of information such as output information, an input unit 94 that receives an operation by a user, and a bus 96 that connects the respective units, and has a hardware configuration utilizing a normal computer.

In the information processing device 50, the respective units described above are implemented on the computer when the CPU 86 reads out a computer program from the ROM 88 onto the RAM 91 to be executed.

The computer program for executing the pieces of processing described above executed by the information processing device 50 may be stored in the HDD 92. The computer program for executing the pieces of processing described above executed by the information processing device 50 may be embedded and provided in the ROM 88.

The computer program for executing the pieces of processing described above executed by the information processing device 50 may be stored in a computer-readable storage medium such as a compact disc read only memory (CD-ROM), a compact disc recordable (CD-R), a memory card, a digital versatile disc (DVD), and a flexible disk (FD) as an installable or executable file to be provided as a computer program product. The computer program for executing the pieces of processing described above executed by the information processing device 50 may be stored in a computer connected to a network such as the Internet and provided by being downloaded via the network. Furthermore, the computer program for executing the pieces of processing described above executed by the information processing device 50 may be provided or distributed via a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical device comprising:
one or more hardware processors configured to function as:
an imaging sensor configured to capture a subject irradiated with a plurality of spectral beams that is split by a light selection unit configured to split an irradiated light beam into the plurality of spectral beams of different wavelength regions to acquire a spectral image, the plurality of spectral beams including beams of at least two different wavelengths;
a deriving unit configured to derive a surface property or shape information of the subject from a specified result obtained by specifying, by the deriving unit, an irradiation region irradiated with each of the spectral beams on the subject based on a mixing ratio of the spectral beams and received light intensity of each of the spectral beams included in the spectral image; and
an irradiation unit that includes:
a light source; and
an optical element configured to reduce an angle of divergence of the light beam emitted from the light source,
the optical element is a lens,
the light source is disposed in a focal point region of the lens, and
the lens causes the light beam emitted from the light source to be quasi-parallel light.

2. The optical device according to claim 1, wherein
the light selection unit splits the irradiated light beam into the spectral beams as a first spectral beam of a first wavelength region and a second spectral beam of a second wavelength region,
the imaging element captures the spectral image of at least the split first wavelength region and the split second wavelength region, and
the deriving unit derives the surface property or the shape information from the specified result obtained by specifying an irradiation region irradiated with each of the first spectral beam and the second spectral beam on the subject based on first received light intensity of the first wavelength region and second received light intensity of the second wavelength region included in the spectral image.

3. The optical device according to claim 2, wherein the deriving unit derives the surface property or the shape information from the specified result obtained by specifying a first irradiation region irradiated only with the first spectral beam of the first wavelength region, a second irradiation region irradiated with the first spectral beam and the second spectral beam, and a third irradiation region irradiated only with the second spectral beam, on the subject.

4. The optical device according to claim 2, wherein the deriving unit derives the surface property or the shape information based on the first received light intensity and the second received light intensity after removing a dark current component.

5. The optical device according to claim 2, wherein
the light selection unit includes a first wavelength selection region through which the first spectral beam passes, and a second wavelength selection region through which the second spectral beam passes, and
the first wavelength selection region and the second wavelength selection region are disposed at different positions.

6. The optical device according to claim 5, wherein a size of a light emitting surface of a light source that emits the light beam is substantially the same as a size of the first wavelength selection region through which the first spectral beam passes.

7. The optical device according to claim 5, wherein a size of a light emitting surface of a light source that emits the light beam is substantially larger than a size of the first wavelength selection region through which the first spectral beam passes.

8. The optical device according to claim 1, wherein the light source includes a light emitting surface having a finite size.

9. The optical device according to claim 1, wherein
the optical element is a concave mirror,
the light source is disposed in a focal point region of the concave mirror, and the concave mirror causes the light beam emitted from the light source to be quasi-parallel light.

10. The optical device according to claim 1, wherein the light selection unit is a diffraction grating.

11. The optical device according to claim 1, wherein
the optical element
contains a transparent medium, and
includes a reflective surface having a paraboloid shape or a quasi-paraboloid shape on an outer surface of the transparent medium, and the light source is disposed in a focal point region of the reflective surface.

12. The optical device according to claim 11, wherein
the optical element includes an incident surface having a planar shape and being opposed to the reflective surface, and
the incident surface is disposed to be opposed to a light emitting surface of the light source.

13. The optical device according to claim 1, wherein
the light selection unit is disposed between the light source and the lens, and
the lens forms an image of a light beam that passes through the light selection unit, on the subject.

14. An information processing method implemented in an optical device comprising one or more hardware processors configured to function as an imaging sensor and a deriving unit, the method comprising:
capturing, by the imaging sensor, a subject irradiated with a plurality of spectral beams that is split by a light selection unit configured to split an irradiated light beam into the plurality of spectral beams of different wavelength regions to acquire a spectral image, the plurality of spectral beams including beams of at least two different wavelengths; and
deriving, by the deriving unit, a surface property or shape information of the subject from a specified result obtained by specifying an irradiation region irradiated with each of the spectral beams on the subject based on a mixing ratio of the spectral beams and received light intensity of each of the spectral beams included in the spectral image,
wherein
the one or more hardware processors are configured to further function as an irradiation unit that includes:
a light source; and
an optical element configured to reduce an angle of divergence of the light beam emitted from the light source,
the optical element is a lens,
the light source is disposed in a focal point region of the lens, and
the lens causes the light beam emitted from the light source to be quasi-parallel light.

15. A computer program product having a non-transitory computer readable medium including programmed instructions, wherein the instructions, when executed by an optical device comprising one or more hardware processors configured to function as an imaging sensor and a deriving unit, cause the one or more hardware processors to perform:
capturing, by the imaging sensor, a subject irradiated with a plurality of spectral beams that is split by a light selection unit configured to split an irradiated light beam into the plurality of spectral beams of different wavelength regions to acquire a spectral image, the plurality of spectral beams including beams of at least two different wavelengths;
deriving, by the deriving unit, a surface property or shape information of the subject from a specified result obtained by specifying an irradiation region irradiated with each of the spectral beams on the subject based on a mixing ratio of the spectral beams and received light intensity of each of the spectral beams included in the spectral image,
wherein
the one or more hardware processors are configured to further function as an irradiation unit that includes:
a light source; and
an optical element configured to reduce an angle of divergence of
the light beam emitted from the light source, wherein
the optical element is a lens,
the light source is disposed in a focal point region of the lens, and
the lens causes the light beam emitted from the light source to be quasi-parallel light.

* * * * *

UNITED STATES PATENT AND TRADEMARK OFFICE
CERTIFICATE OF CORRECTION

| | |
|---|---|
| PATENT NO. | : 11,333,492 B2 |
| APPLICATION NO. | : 17/005526 |
| DATED | : May 17, 2022 |
| INVENTOR(S) | : Hiroshi Ohno et al. |

It is certified that error appears in the above-identified patent and that said Letters Patent is hereby corrected as shown below:

In the Claims

Claim 1, Column 22, Line 8, "light source," should read --light source, wherein--.

Signed and Sealed this
Third Day of January, 2023

Katherine Kelly Vidal
*Director of the United States Patent and Trademark Office*